April 3, 1951  A. D. SMITH, JR., ET AL  2,547,051
RADIO DETECTION SYSTEM FOR FINDING
RANGE AND DIRECTION
Filed May 29, 1943  4 Sheets-Sheet 3
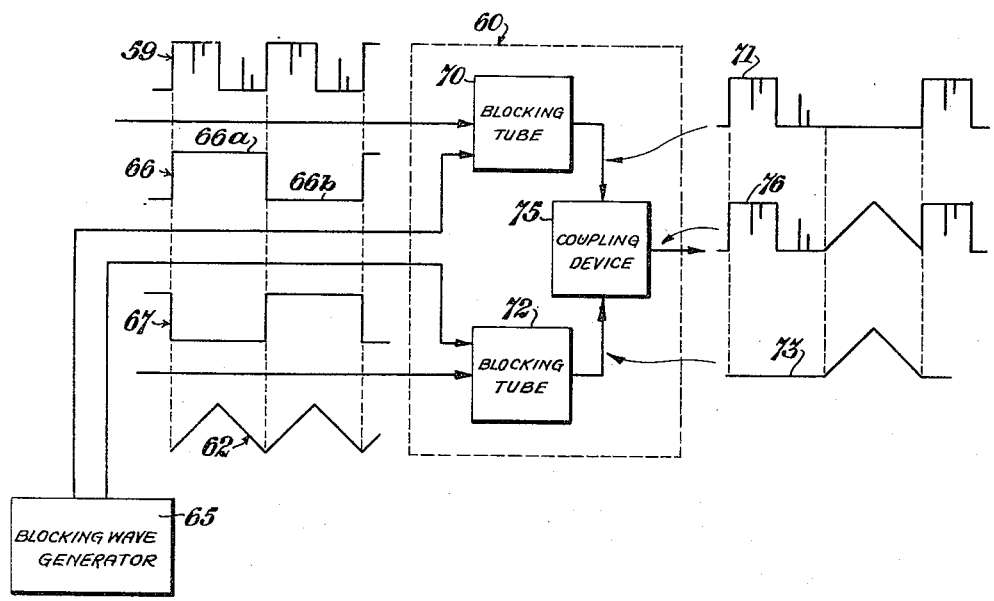
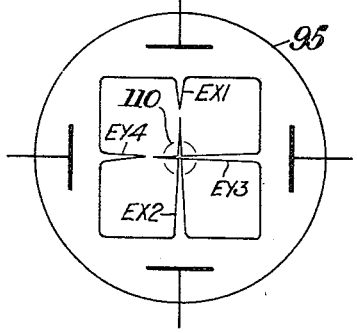
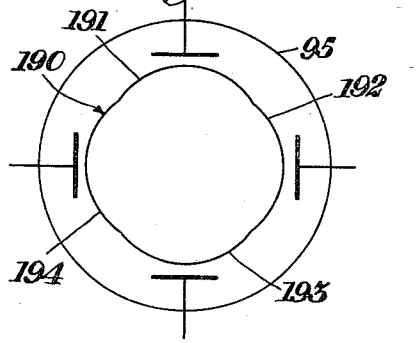
INVENTORS
ARCHIBALD D. SMITH, JR.
HORACE M. GUTHMAN
BY
ATTORNEY

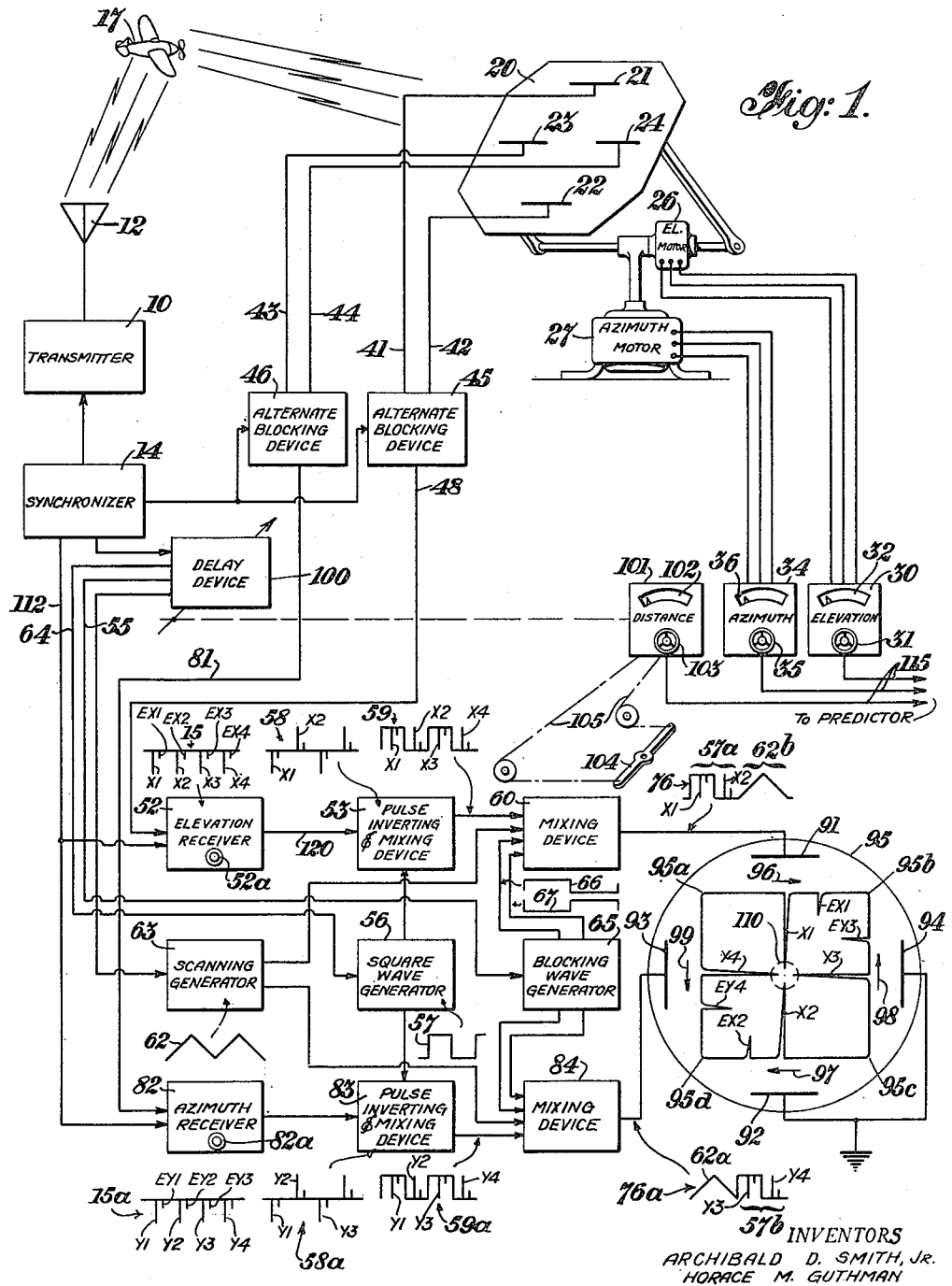

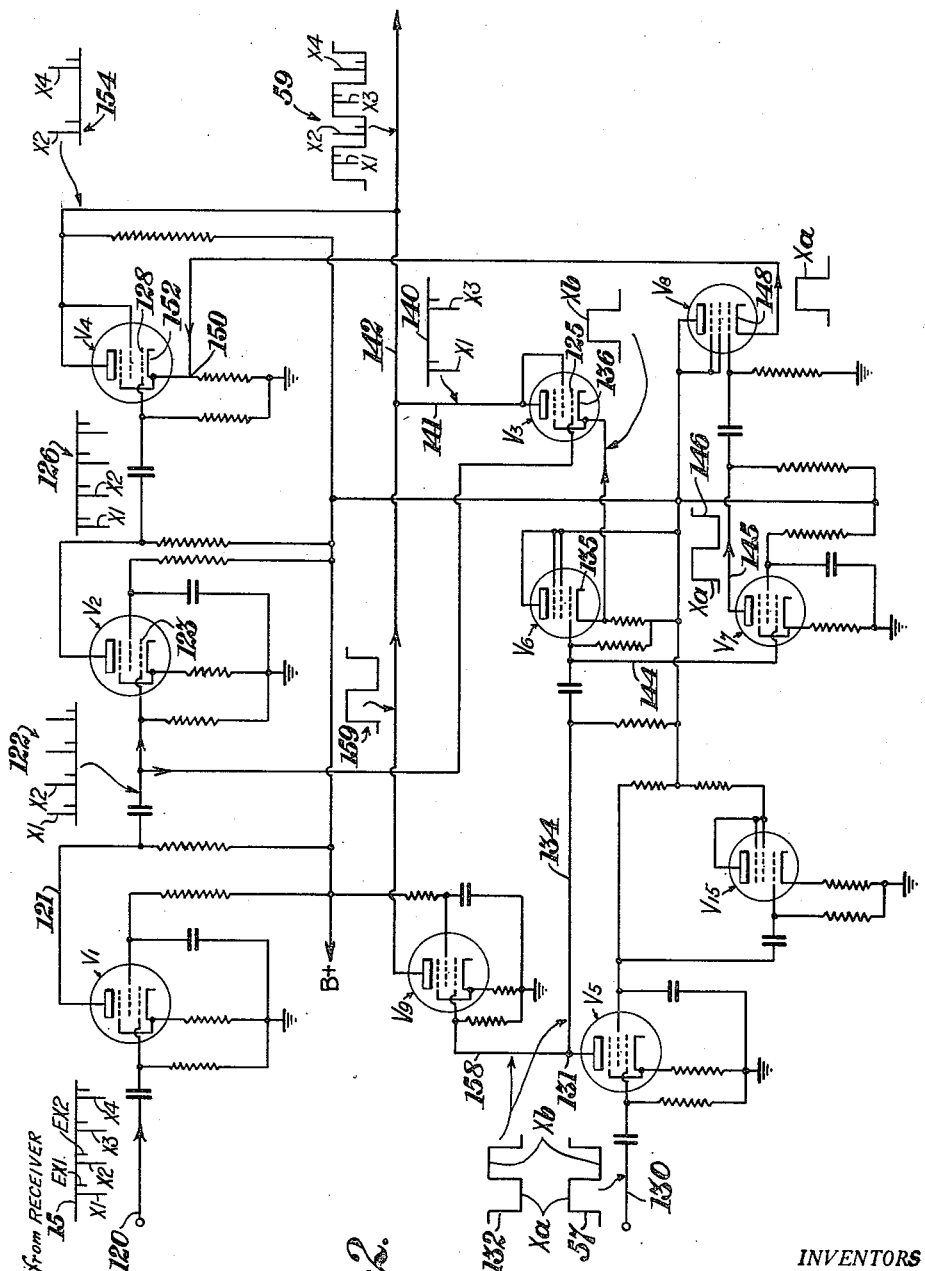

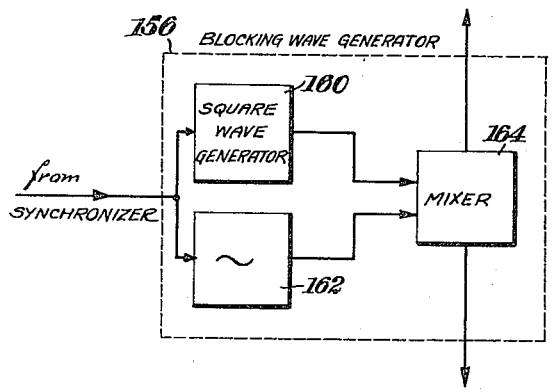
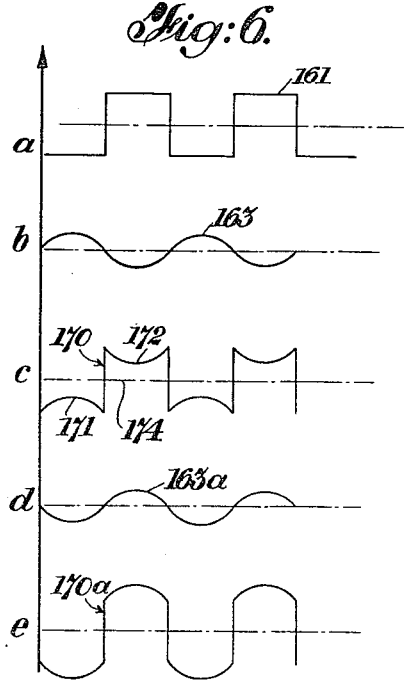
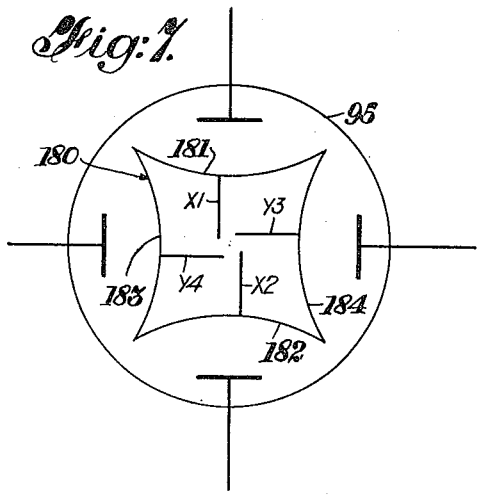
INVENTORS
ARCHIBALD D. SMITH, JR.
HORACE M. GUTHMAN
ATTORNEY Patented Apr. 3, 1951

2,547,051

UNITED STATES PATENT OFFICE 2,547,051

RADIO DETECTION SYSTEM FOR FINDING RANGE AND DIRECTION

Archibald D. Smith, Jr., Amityville, and Horace M. Guthman, Brooklyn, N. Y., assignors to Federal Telephone and Radio Corporation, Newark, N. J., a corporation of Delaware Application May 29, 1943, Serial No. 488,976

21 Claims. (Cl. 343—11)

This invention relates to radio detection systems such as used for detecting hostile aircraft and ships and for supplying the detected information to predictors associated with gun emplacements.

It is one of the objects of our invention to provide a radio detection system capable of being operated easily and accurately by a single operator.

Another object of our invention is to provide a method and means for readily determining with a high degree of accuracy the direction to and/or range of a detected craft or other obstacle.

Another object of our invention is to provide a scanning circuit for cathode ray oscillographs for use in radio detecting systems and other electrical circuits by which the focusing and other adjustment indications such as required for determination of elevation, azimuth and range of a detected obstacle are easily observed and compared with a high degree of accuracy.

Still another object of the invention is to provide a scanning circuit for cathode ray oscillographs capable of providing at least two spaced apart trace lines of predetermined character by which corresponding pulsations on the lines may be easily compared as to alignment and amplitude.

The above and other objects of the invention will become more apparent from the following detailed description and the appended claims read in connection with the accompanying drawings, in which:

Fig. 1 is a schematic block diagram of a radio detection system in accordance with the principles of our invention;

Fig. 2 is a schematic wiring diagram of a part of the scanning circuit for the oscillograph of the system;

Fig. 3 is a block diagram of another part of the scanning circuit of the oscillograph together with graphical illustrations of the scanning potential and deflecting pulsations applied to one of the deflection circuits of the oscillograph;

Fig. 4 is a schematic illustration of the oscillograph screen with a four sided tracing in which the opposed pulsations, while shown in alignment, indicating accurately the range of the obstacle producing the pulsations, are of different amplitude and therefore indicate that the system is improperly directed at the obstacle producing the pulsations;

Fig. 5 is a block diagram of a modified portion of the scanning circuit for the system shown in Fig. 1;

Fig. 6 is a graphical illustration of the operating steps of the elements of Fig. 5; and Figs. 7 and 8 are schematic illustrations of an oscillograph provided with tracings in accordance with the scanning features of Figs. 5 and 6.

Referring to Fig. 1, the radio detection system therein shown includes a transmitter 10 having an antenna 12 which is arranged to transmit a train of impulses such as the series X1, X2, X3, X4, etc. indicated by curve 15 (Fig. 1) in accordance with the operation of a synchronizer 14. Reradiatable obstacles such as a metallic aircraft 17 within the range of the system will reflect the impulses as echo pulses EX1, EX2, etc. curve 15. These echo pulses are received on antenna elements 21, 22, 23 and 24 of a directional antenna 20. The directional antenna 20 may comprise any suitable arrangement of elements where the radiation lobes are disposed two in a vertical plane, such as represented by the positioning of antenna elements 21 and 22, and two in a horizontal plane, such as represented by the positioning of elements 23 and 24. If desired, any antenna array giving the proper distribution of lobes, vertically and horizontally, may be used. The transmitting antenna may even be incorporated in the array.

The angular position of the antenna 20 is controlled in elevation by a motor 26, and in azimuth by a motor 27. The motor 26 is controlled manually by a motor control device 30 having a manually adjustable control 31. The adjustment of the motor and therefore the angular position of the antenna 20 in elevation is indicated by a suitable dial and index device as shown at 32. The angle of adjustment of the antenna 20 for azimuth is likewise performed by a control device 34 for the motor 27. The control 34 has a manually adjustable control 35 and an indicating dial 36.

The energy received by antenna elements 21 and 22 is transmitted over leads 41 and 42 to an alternate blocking or switch device 45. The energy received by antennas 23 and 24 is likewise transmitted over leads 43 and 44 to a second blocking or switching device 46. The devices 45 and 46 which may be any known type of electronic switch or one of the character disclosed in copending application of H. Busignies and A. D. Smith, Jr., Serial No. 474,143, filed January 30, 1943, are synchronized with the transmission of impulses by the synchronizer 14. The blocking devices each operate to pass alternately the energy received by the two antennas connected therewith. That is to say, the antenna 21 is connected for reception through the device 45 of an impulse X1 (curve 15) and echo pulses such as pulse EX1 received in response to impulse X1, and then is blocked during the interval of reception for the next succeeding impulse X2 and corresponding trailing echo pulses. The impulse X2 and its echo pulses received by the antenna element 22 during the interval that reception by antenna 21 is blocked are now passed by the device 45. This alternate blocking then repeats with passage of impulse X3 from antenna 21 and then impulse X4 from antenna 22, etc. The device 46 operates similarly permitting passage of received energy from antennas 23 and 24. The energy passed by device 46 is represented by impulses Y1, Y2, Y3, Y4, etc. and their respective echo pulses EY1, EY2, EY3, EY4, etc. (curve 15a). The corresponding impulses X1, Y1; X2, Y2, etc. are in timed relation since the corresponding impulses are derived from energy of the same pulse transmitted at 12.

Following through the circuit with the pulse energy passed by the alternate blocking device 45, this energy is passed by a lead 48 to a receiver 52. The transmitted impulses X1, X2, X3, X4 etc. and their respective echo pulses received by the elevation antennas 21 and 22 are detected and amplified by the receiver 52. In curve 15, we have shown for simplification, the reception of a single echo pulse reflected by craft 17 in response to each of the transmitted impulses.

The train of impulses and echo pulses received at the receiver 52 is applied to a pulse inverting and mixing device 53. The details of the circuit 53 which are shown in Fig. 2 will be described hereinafter. For the present, the general function of the device will be explained.

Synchronized with the transmission of impulses by connection 64 with the synchronizer 14 and passing through an adjustable delay device 100 is a square wave generator 56. The rectangular wave 57 produced by the generator 56 is applied to the device 53 and this rectangular wave is used to invert alternate pulses as indicated by wave 58 and then superimpose them on the rectangular wave 57 in the manner indicated by wave 59. The output wave 59 of the inverting and mixing device 53 is applied to a mixing device 60.

The mixing device 60 serves to replace alternate cycles of the wave 59 with a cycle of a scanning wave 62. The wave 62 is of saw-tooth triangular form and is generated by a generator 63 synchronized through delay device 100 by the synchronizer 14. This mixing operation is controlled by a blocking wave generator 65 which produces two rectangular waves 66 and 67 the phases of which are 180° apart and the cycles of which are twice the duration of the cycles of the rectangular wave 59.

The mixing operation of the device 60 will be explained by reference to Fig. 3. The wave 59 is applied to a blocking tube 70 which is biased by the potential of wave 66. The portion 66a of the curve operates to pass energy of the wave 59 while the portion 66b operates to block the wave 59. This results in an output for the tube 70 corresponding to wave 71. The waves 62 and 67 are applied to a second blocking tube 72 in a similar manner whereby an output wave 73 is produced in which alternate cycles of the scanning wave 62 appear. The waves 71 and 73 are combined by a coupling device 75 thereby resulting in wave 76. It will be noted that the cycles of wave 76 now comprise as alternate cycles, a cycle of the wave 59 and a cycle of wave 62.

Referring back to Fig. 1, it will be observed that the pulse energy (pulses Y1, EY1, Y2, EY2 etc. curve 15a) at the output of the blocking device 46 for antennas 23 and 24 is applied over connection 81 to a receiver 82. Similarly as in the case of receiver 52, the output of the receiver 82 is applied to a pulse inverting and mixing device 83 similar to the device 53, whereby an inversion of successive pulsation intervals is obtained (curve 58a) and the pulsations applied to a rectangular wave as indicated by curve 59a by application to the device 83 of the rectangular wave 57 from the generator 56. The wave 59a is applied with the energy of the wave 62 to a mixing device 84 identical to the device 60 to which blocking energy from generator 65 is applied. The device 84 has an output wave 76a which is similar to the wave 76 (Fig. 3) except that wave 76a is 180° out of phase therewith and the impulses appearing here are those received by the azimuth antennas 23 and 24. This phase relationship is readily observed from the aligned relationship of the two waves illustrated in Fig. 1. This difference in phase is obtained by reversing the wave energy 66 and 67 from that shown in Fig. 3. That is to say, the wave 67 is used for blocking alternate cycles of the curve 59a while curve 66 is used for blocking alternate cycles of the wave 62.

The wave 76 is applied preferably across the vertical deflecting plates 91 and 92 while the wave 76a is applied across the horizontal plates 93 and 94. The scanning portion 62a of wave 76a controls the movement of the cathode ray beam between deflecting plates 93 and 94. During the movement of the beam from the left to the right of the screen 95, the portion 57a of wave 76 controls the vertical deflection of the beam. Thus, the potentials 62a and 57a cause the beam to shift to point 95a and to travel therefrom as indicated by arrow 96 to 95b, thereby providing (in the absence of impulses X1, EX1 etc.) a substantially straight trace between those two points. The drop in potential at the side between the first and second squares of the portion 57a causes the beam to shift instantly from point 95b to point 95c so that during the last half of the scanning potential 62a, the beam traces in the direction of arrow 97 a line between points 95c and 95d. At the end of the deflection portion 57a, the portion 62b of curve 76 controls the vertical scanning of the beam while portion 57b of curve 76a controls the horizontal deflection of the beam. Thus, as the potential 62b controls the scanning of the beam between the bottom and top side of the screen, the beam will be caused to first shift back to point 95c and then move as indicated by arrow 98 between points 95c and 95b and on the return movement of the beam between points 95a and 95d as indicated by arrow 99. It will be observed, therefore, that a substantially square tracing will be produced according to the wave forms of curves 76 and 76a.

At this point in the description, we want to make it clear that our system is not limited to a rectangular tracing but may produce in effect two trace lines spaced apart in accordance with any two of the parallel trace lines of the tracing illustrated. By this we mean that by applying the wave 57 across the vertical plates 91 and 92 and by applying the scanning wave 62 across the horizontal plates 93 and 94, two tracings one between points 95a and 95b and the other between points 95c and 95d will be produced. This parallel tracing effect as will be clear hereinafter, may be used for producing alignment between corresponding echo pulses for the purpose of obtaining the range on the obstacle producing such echo pulses. It will also be clear that by reversing the application of the waves 57 and 62 with respect to the deflection plates, two parallel trace lines one extending between points 95a and 95d and the other between points 95b and 95c may be obtained.

Before considering the means of determining the elevation and azimuth of a detected obstacle, the means for determining the distance to the obstacle will be described. The delay device 100 in the synchronizing circuit for the generators 53, 56 and 65 is controlled by device 101. The control device includes a dial and indicator arrangement 102 by which the degree of retardation of energy passing through the device 100 is indicated. The device 101 may be controlled by a hand control 103 or by means of a foot pedal 104 connected thereto by cables 105 or by any other suitable motion transmitting means. Assuming that the receivers 52 and 82 are conditioned to receive the impulses transmitted by the transmitter 10, the impulses will appear on the screen 95 as X1, X2, Y3 and Y4. To obtain a zero distance indication on the device 101, the delay device 100 is adjusted by manipulation of the control 103 until each pair of transmitter pulsations X1, X2 and Y3, Y4 are brought into alignment. It is preferable to control the amplitude of the pulsations by means of amplitude controls 52a and 82a associated with receivers 52 and 82 so that the peaks thereof will extend within a centrally located circular mark 110 on the screen 95. It will be understood that manipulation of the control 103 will cause the pulsations of each pair (X1, X2 and Y3, Y4) to move in opposite directions as indicated by arrows 96, 97 and 98, 99. By proper manipulation it is possible to line up the opposed pulsations substantially as indicated. This adjustment may be taken as the zero distance position for the control. It will be understood, of course, that it is only necessary to check on the zero distance indication of the system occasionally for purposes of checking the calibration of the distance indicating dial 102.

Since each impulse is accompanied by an echo pulse, the echo pulse EX1 following the pulsation X1 is to the right of X1 on the screen 95 while the echo pulse EX2 is to the left of pulsation X2. By proper manipulation of the control 103, the pulsations X1 and EX1 will be shifted to the left and the pulsations X2 and EX2 will be shifted to the right until the pulsations EX1 and EX2 are in alignment. The adjustment likewise shifts the opposed pulsations EY3 and EY4 into alignment. When this condition is reached, the adjustment of the control as indicated on the dial 102 will give the distance to the aircraft 17. By proper adjustment of controls 52a and 82a the amplitude of the echo pulses can be increased until their tips coincide, thereby giving a more accurate setting than would be had were they left small.

When it is desirable to obtain indications of elevation and azimuth of the aircraft or some other obstacle, it may be desirable to eliminate the pulsations X1, X2 and Y3, Y4 from the screen. This may be accomplished by a blocking circuit from the synchronizer 14 or transmitter 10. A suitable blocking control for this purpose is shown in the copending application of E. Labin, Serial No. 471,228, filed January 4, 1943, now Patent No. 2,471,436, granted May 31, 1949. The blocking potential of the Labin system comprises a negative potential obtained in the generation of the impulse energy for the transmitter. This negative potential is then expanded in time so as to overlap the period of radiation of the impulse. It is this negative potential that may be applied through connection 112 to the receivers 52 and 82 to block them during the radiation of the impulses.

In place of blocking the impulses, their amplitudes may be limited so that they will not extend more than half way across the screen 95.

Assuming that the antenna 20 is not properly focused on the aircraft 17, the amplitude of the two pulsations EX1 and EX2 for elevation will not be equal. Such a condition is illustrated in Fig. 4. Thus, while the pulsations EX1 and EX2 will serve when in alignment as indicated in Fig. 4 for the purpose of obtaining the distance to the aircraft, still other adjustments are necessary to obtain an accurate indication of elevation and azimuth. By proper manipulation of the control 31 for the elevation motor 26, the antenna 20 may be maneuvered in a vertical plane until the echo pulses received by the antennas 21 and 22 are substantially equal. When this condition is reached, the pulsations EX1 and EX2 will be substantially equal in amplitude and the peaks thereof will extend closely adjacent the center of the circular mark 110. Such a condition is illustrated on the screen 95 of Fig. 1 for the pulsations X1, X2, and Y3, Y4. When this equal amplitude condition of the pulsations EX1 and EX2 is obtained, the elevation indication at 32 gives the angle of elevation to the location of the aircraft 17.

The adjustments for azimuth are similar to the adjustments for elevation. The control 35 is manipulated to shift the antenna 20 so as to move the antennas 23 and 24 in a horizontal plane until they receive equal intensity of the echo pulses. As stated in connection with the elevation adjustments, when an equal amplitude condition is reached for pulsations EY3 and EY4, the dial indication at 36 will give the angle of azimuth to the location of aircraft 17. The location data of distance, elevation and azimuth obtained and maintained accurate while the craft is in flight may be transmitted automatically over connections 115 to predictor mechanism for gun emplacements.

From the foregoing, it will be clear that a single operator may, by watching the screen 95 of the single oscillograph, manipulate the three controls 31, 35 and 103 with secondary adjustments of controls 52a and 82a to obtain accurate indications of elevation, azimuth and distance to the location of the aircraft 17 or any other obstacle detected by echo pulses produced thereby. This is of particular importance today where skilled operators are in such great demand.

It will also be clear that the system may be used for obtaining distance only or for direction finding only. In either case, the apparatus may be simplified to include only that portion of the apparatus necessary to perform the function desired.

Referring back to Fig. 2, a detailed description of the pulse inverting and mixing device 53 will now be given. The train of pulses X1, X2, X3 and X4 (curve 15) detected by receiver 52 is applied to the input 120 to an amplifier tube V1 which acts as a coupling amplifier for the device. The anode output 121 reverses the pulses X1, X2, etc. to positive pulses as indicated at 122. The pulses of curve 15 are illustrated as negative but, of course, may be taken as positive, whichever adjustment is desired.

The energy according to the train of pulses 122 is applied to the control grid 123 of a vacuum tube V2 and to the control grid 125 of a vacuum tube V3. The tube V2 operates to invert the energy 122 applied thereto as shown at 126. This inverted energy 126 is applied to the control grid 128 of a vacuum tube V4. As will be explained hereinafter, tubes V3 and V4 operate to block out alternate sections of the energy 122 and 126, respectively.

The rectangular wave 57 produced by the generator 56 (Fig. 1) is applied to the input 130 to the control grid of a tube V5. Each cycle of the wave 57 is formed of two rectangular portions $Xa$ and $Xb$. This wave energy when obtained from the anode connection 131 of the tube V5 is inverted as indicated at 132. This energy is passed over connection 134 to a grid of tube V6. The portions $Xb$ of the rectangular wave will be positive on the cathode 135 of tube V6. This positive portion $Xb$ is applied to the cathode 136 of the tube V3 as a blocking potential so that alternate pulses such as the pulses X2 and the associated echo pulse EX2 are eliminated from wave 122. This leaves the anode energy of the tube V3 substantially as indicated at 140. This anode energy is applied over connection 141 to an outlet connection 142.

The blocking potential for tube V4 is taken from the anode connection 134 of tube V5 by a connection 144. The connection 144 applies the wave energy 132 to the control grid of a vacuum tube V7. By taking the anode energy at 145, it will be seen at 146 that the wave is inverted so that the portion $Xa$ is now positive. This wave energy 146 is applied to the control grid of a vacuum tube V8. The portion $Xa$ of the wave 146 is positive at the cathode 148 of the tube V8 and is applied over connection 150 to the cathode 152 of the tube V4 thereby blocking the tube V4 to those pulses occurring during the intervals covered by portions $Xa$ of the wave 132. Since portions $Xa$ are in phase with the portions of the input wave 15 at 120 in which X1 and EX1 occur, those pulses will be eliminated leaving pulses X2 and EX2 as indicated at 154. The anode output of tube V4 as indicated at 154 is applied to the outlet connection 142.

The rectangular wave 132 is also applied as indicated at 158 to the control grid of a vacuum tube V9. By taking the anode potential of the tube V9, the wave 132 will be inverted back to the phase relation of the input curve 57 at 130. This anode energy is indicated at 159 and is applied to the output connection 142. The combining effect of the rectangular wave 159 with the pulse energies 140 and 154 produces the final output wave 59. It will now be observed that the pulses X2, X4 have been inverted with respect to the pulses X1, X3 and the pulses X1, X2, X3 and X4 applied to the successive portions of the rectangular wave.

Referring to Figs. 5, 6, 7 and 8 of the drawings, we show a modification of the scanning potential for the oscillograph to be used in the system of Fig. 1. The block 156 replaces the wave generator 56 of Fig. 1. The apparatus of this block diagram is arranged to produce a wave shape differing from the rectangular wave shape 57 by a curvature which operates during the scanning periods to deflect the tracing so as to produce inwardly or outwardly directed cusp portions, whichever may be desired as indicated in Figs. 7 and 8. The cusps of the scanning line extend the length of the tracing thereby enabling an operator to obtain a more accurate alignment of the pulses.

The block diagram 156 includes a square wave generator 160 and an oscillator 162 which are controlled by connection 64 from the synchronizer 14. Curve $a$ of Fig. 6 represents a rectangular wave 161 produced by the generator 160. The oscillator 162 produces a sinusoidal wave 163 or 163$a$ of the phase relations indicated by curves $b$ and $d$ of Fig. 6. When the waves of curves $a$ and $b$ are mixed in mixer tube 164, a wave 170 substantially as indicated by curve $c$ is produced. This wave includes alternate curved portions 171 and 172 the cusps of which extend toward the axis 174 of the wave. When the waves of curves $a$ and $d$ are mixed a wave 170$a$ is produced substantially as shown by curve $e$.

The wave 170 or 170$a$, as the case may be, is used in the system of Fig. 1 in the same manner in which the rectangular wave 57 is used. As shown on the screen 95 in Fig. 7, the tracing 180 corresponding to wave 170 is four sided in which each side 181, 182, 183 and 184 curves inwardly toward the center of the screen. Likewise, curve 170$a$ will produce a tracing 190 in which each side 191, 192, 193 and 194 curves outwardly on the screen. By controlling the amplitude relationship of the wave 161 (curve $a$) and 163$a$ (curve $d$), the curvature of the sides may be varied from substantially rectangular to circular and further to a four lobe effect. The lobe effect is indicated slightly in Fig. 8.

While we have shown and described the principles of our invention in connection with specific embodiments, we recognize that various changes and modifications may be made therein without departing from the invention. For example, the crests of the oppositely curved portions of the tracings of Figs. 7 and 8 may be arranged to extend in the same direction, especially where only two spaced apart tracings are desired. The scanning intervals may also be increased with corresponding decrease in the amplitude of the deflection wave 57 (Fig. 1) or 161 (Fig. 6) and by proper control of the beam intensity show on the screen 95 only the central position of each side of the tracing. It is, therefore, our aim in the appended claims to cover all such changes and modifications as fall within the scope of our invention.

We claim:

1. A method of determining the distance to an obstacle indicated on the screen of a cathode ray oscillograph by echo pulses produced by the obstacle in response to transmitted impulses, comprising transmitting impulses, detecting echo pulses produced by said obstacle, producing at least two spaced apart trace liners on the oscilloscope screen, controlling the course of the respective traces by energy of the said impulses and of said echo pulses applied synchronously with the occurrence of the respective traces and with a respective mutually opposed polarity so that oppositely extending impulse and echo pulse indications are produced on the respective trace lines, retarding certain of the beam controlling energy until the impulse indications of the two lines are in alignment thereby obtaining a zero distance indication, and varying the retardation of the beam controlling energy until the opposed echo pulse indications corresponding to the detected obstacle are in alignment, whereby the adjustment of energy retardation from the zero indication corresponds to the distance to said obstacle.

2. The method defined in claim 1 wherein said two trace lines are made substantially parallel.

3. The method defined in claim 1, wherein said two trace lines are curved.

4. A method of determining the location of an obstacle indicated on the screen of a cathode ray oscillograph by echo pulses received by antenna means including at least two spaced apart antennas, comprising transmitting impulses, detecting echo pulses produced by the obstacle, providing scanning energy to control the beam of the oscillograph to produce across said screen at least two spaced apart trace lines, effecting alternately an indication on each of the trace lines of corresponding echo pulses as received by the respective antennas, applying the energies due to the respective pulses to produce substantially juxtaposed indications, varying the angular relation of the antennas and substantially equalizing the amplitude of the traces of the juxtaposed echo pulses corresponding to said obstacle, whereby the positioning of the antennas represents one of the direction components to the location of said obstacle.

5. The method defined in claim 4 wherein said two trace lines are substantially parallel and the respective pulse energies are applied with mutually opposed polarity to produce indications disposed in opposed directions.

6. The method defined in claim 4 wherein scanning energy is provided of the character to produce trace lines which are curved.

7. A method of determining the location of an obstacle indicated on the screen of a cathode ray oscillograph by means of echo pulses produced by the obstacle in response to transmitted impulses, comprising transmitting impulses, providing scanning energy to control the cathode ray beam to produce a four sided tracing on the screen of the oscillograph, each side of the tracing representing a given time interval for transmission of an impulse and the reception of echo pulses for a given range, receiving certain of the echo pulses for elevation determination and receiving certain other of the echo pulses for azimuth determination, applying the elevation echo pulses to said beam in synchronism with the scanning of two opposed sides of the tracing to produce corresponding pulse indications thereon, and applying the azimuth echo pulses to said beam in synchronism with the scanning of the other two opposed sides of the tracing to produce corresponding pulse indications thereon, varying directivity of reception for elevation until the elevation echo pulse indications are of corresponding amplitude, and varying directivity of reception for azimuth until the azimuth echo pulse indications are of corresponding amplitude, whereupon the directivity adjustments represent angles of elevation and azimuth to the location of said obstacle.

8. The method defined in claim 7 in combination with the step of retarding the scanning energy until the opposed echo pulses of the four sided tracing are in alignment, whereby such retardation adjustment corresponds to the distance to said obstacle.

9. A system for determining the distance to an obstacle comprising means for transmitting impulses, means to receive echo pulses produced by reflection from the obstacle in response to transmitted impulses, an oscillograph, scanning means to apply scanning energy to the cathode ray beam of the oscillograph to produce across the screen of said oscillograph at least two trace lines, means to invert the impulse and echo pulse energy with respect to one another means to apply alternately on the two trace lines the inverted energy corresponding to said impulses and said echo pulses respectively, the indications on the two lines extending in opposed directions, means to retard the scanning energy until the impulse indications on the two lines are in alignment, thereby obtaining a zero distance indication, and said energy retarding means being further adjustable to bring opposed echo pulse indications corresponding to the detected obstacle into alignment, whereby the adjustment of said retardation means from zero indication corresponds to the distance to said obstacle.

10. The system defined in claim 9 wherein said scanning means includes linear trace line generating means to produce the two lines spaced apart in substantially parallel relationship.

11. The system defined in claim 9 wherein the said scanning means includes means providing a voltage wave having curved portions and means for generating a tracing signal therefrom in which the crest of alternate curved portions are extended in opposite directions.

12. A system for determining the location of an obstacle comprising means to transmit impulses, a pair of direction finding antennas, a receiver, means to alternately switch the antennas in connection with said receiver in synchronism with transmission of impulses, an oscillograph, scanning means to produce across the screen of said oscillograph at least two trace lines, means synchronized with said switching means to apply alternately pulse indications of the echo pulses produced by said obstacle in response to said impulses first one on one of said lines and the next to the other of said lines, and means to vary the angular relation of said antennas until the opposed echo pulses are of substantially equal amplitude, whereupon the positioning of the antennas represents one of the direction components to the location of said obstacle.

13. The system defined in claim 12 wherein the two antennas are arranged for movement in a vertical plane so that the direction component obtained is the angle of elevation to the location of said obstacle.

14. The system defined in claim 12 wherein the two antennas are arranged for movement in a horizontal plane so that the direction component obtained is the angle of azimuth to the location of said obstacle.

15. The system defined in claim 12 wherein the scanning means is arranged to produce the two lines spaced apart in substantially parallel relationship.

16. The system defined in claim 12 wherein the scanning means includes means providing a voltage wave having curved portions in which the crest of alternate curved portions are extended in opposite directions.

17. A system for determining the location of an obstacle comprising means to transmit impulses, receiver means having a directional antenna, an oscillograph, means to provide scanning energy to produce a four sided tracing on the screen of the oscillograph, each side of the tracing representing a given time interval for transmission of an impulse and the reception of echo pulses in response thereto for a given range, control means to adjust the directional antenna for reception of certain of the echo pulses for elevation determination and to adjust the antenna for reception of other of the echo pulses for azimuth determination, means to apply the elevation echo pulses to the oscillograph for location of corresponding pulse indications on two opposed sides of the tracing, means to apply the azimuth echo pulses to the oscillograph for location of corresponding pulse indications on the other two opposed sides of the tracing, said antenna control means being adjustable until the elevation echo pulse indications are of substantially equal amplitude and the azimuth echo pulse indications are of substantially equal amplitude, whereupon the directivity adjustments thereof represent angles of elevation and azimuth to the location of said obstacle.

18. The system defined in claim 17, in combination with means for retarding the scanning energy until the opposed echo pulses of the four sided tracing are in alignment, whereby the retardation adjustment corresponds to the distance to said obstacle.

19. A radio detection system having means to transmit impulses, a directional antenna, receiver means coupled with said antenna to detect (as to angles of elevation and azimuth) echo pulse reflections produced by an obstacle in response to said impulses, control means for adjusting the antenna in angles of elevation and azimuth, a cathode ray oscillograph, scanning means including adjustable delay means for retarding the scanning energy thereof, means to apply to said oscillograph energy of said impulses and echo pulses to produce separate indications on the oscillograph screen, means to operatively relate the amplitude of the pulse indications to the directive angles of elevation and azimuth as determined by the position of the antenna, and means to vary the mutual pulse indication positions according to the distance of the reflecting object, whereby one operator is capable by observing the screen of the oscillograph to manipulate said control means for determination of angles of elevation and azimuth and to manipulate said adjustable delay means to obtain the range of the detected obstacle.

20. A visual indicator for simultaneously selecting preferred values of three variable quantities, comprising means for displaying four linear marks in two parallel pairs, means to vary the relative lengths of the marks in one pair in response to changes in the value of one of said variable quantities, means to vary the relative lengths of the marks in the other pair in response to changes in the value of a second of said variable quantities, and means to move the marks of either pair in the direction perpendicular to their lengths in response to changes in the value of the third of said variable quantities.

21. An arrangement for determining the range, azimuth and elevation of an object, comprising a source of electromagetic waves, means to transmit waves from said source to the object, directionally selective means for receiving echo waves from the object in response to the transmitted waves, means to adjust the direction of pointing of said directionally selective means, an oscilloscope, means to display upon the screen of said oscilloscope a plurality of elongated marks the relative lengths of which indicate a departure of the direction of pointing of said directionally selective means from the direction of the object, a range measuring device controlled by echo waves from said object and having a range scale, said range measuring device comprising means to vary the range scale reading and simultaneously to vary the positions of said marks relative to one another to indicate a departure of the scale reading of the said range measuring device from the correct reading corresponding to the range of the object.

ARCHIBALD D. SMITH, JR.
HORACE M. GUTHMAN.

REFERENCES CITED

The following references are of record in the file of this patent:

UNITED STATES PATENTS

| Number | Name | Date |
|---|---|---|
| 1,924,174 | Wolf | Aug. 29, 1933 |
| 2,127,415 | Marique | Aug. 16, 1938 |
| 2,189,549 | Hershberger | Feb. 6, 1940 |
| 2,275,460 | Page | Mar. 10, 1942 |
| 2,312,761 | Hershberger | Mar. 2, 1943 |
| 2,406,358 | Doba | Aug. 27, 1946 |

FOREIGN PATENTS

| Number | Country | Date |
|---|---|---|
| 552,072 | Great Britain | Mar. 22, 1943 |